United States Patent
Harper et al.

(10) Patent No.: US 7,197,558 B1
(45) Date of Patent: Mar. 27, 2007

(54) METHODS AND SYSTEMS FOR NETWORK ELEMENT FAULT INFORMATION PROCESSING

(75) Inventors: Raymond Jay Harper, Covington, GA (US); Daniel Doutt, Woodstock, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 789 days.

(21) Appl. No.: 10/015,682

(22) Filed: Dec. 17, 2001

(51) Int. Cl.
G06F 15/173 (2006.01)
G06F 15/16 (2006.01)
G06F 11/00 (2006.01)

(52) U.S. Cl. ............ 709/224; 709/206; 709/219; 714/25; 714/26; 707/3; 707/204

(58) Field of Classification Search ............ 709/224, 709/217, 219, 206; 714/4, 25–26, 37–39, 714/48; 707/3, 204
See application file for complete search history.

(56) References Cited

U.S. PATENT DOCUMENTS

| | | | |
|---|---|---|---|
| 4,937,825 A * | 6/1990 | Ballard et al. | 714/712 |
| 5,751,965 A * | 5/1998 | Mayo et al. | 709/224 |
| 5,884,072 A * | 3/1999 | Rasmussen | 709/224 |
| 5,996,010 A * | 11/1999 | Leong et al. | 709/223 |
| 6,006,016 A * | 12/1999 | Faigon et al. | 714/26 |
| 6,073,255 A * | 6/2000 | Nouri et al. | 714/31 |
| 6,079,034 A * | 6/2000 | VanZante et al. | 714/48 |
| 6,088,816 A * | 7/2000 | Nouri et al. | 714/31 |
| 6,115,713 A * | 9/2000 | Pascucci et al. | 707/10 |
| 6,138,250 A * | 10/2000 | Nouri et al. | 714/31 |
| 6,157,967 A * | 12/2000 | Horst et al. | 710/19 |
| 6,182,225 B1 * | 1/2001 | Hagiuda et al. | 726/19 |
| 6,205,563 B1 * | 3/2001 | Lewis | 714/47 |
| 6,229,538 B1 * | 5/2001 | McIntyre et al. | 715/734 |
| 6,253,243 B1 * | 6/2001 | Spencer | 709/224 |
| 6,269,330 B1 * | 7/2001 | Cidon et al. | 714/43 |
| 6,292,099 B1 * | 9/2001 | Tse et al. | 340/506 |
| 6,321,350 B1 * | 11/2001 | Baskey et al. | 714/704 |

(Continued)

OTHER PUBLICATIONS

Piscitello, David M. et al. "Network Management Capabilities for Switched Multi-Megabit Data Service." ACM SIGCOMM Computer Communication Review. vol. 20, Issue 2. Apr. 1990. pp. 87–97. ACM Press.*

(Continued)

Primary Examiner—Jason Cardone
Assistant Examiner—Jeffrey R. Swearingen
(74) Attorney, Agent, or Firm—Withers & Keys, LLC

(57) ABSTRACT

Embodiments of the present invention relate to systems and methods for network element fault information processing. In an embodiment, a network element identifier and a network element fault information processing instruction are received. A query for network element fault information based at least in part on the network element identifier is sent. Network element fault information is received. The network element fault information is processed based at least in part on the received network element fault information. The processed network element fault information is output.

15 Claims, 4 Drawing Sheets

U.S. PATENT DOCUMENTS

| | | | |
|---|---|---|---|
| 6,363,421 B2 * | 3/2002 | Barker et al. | 709/223 |
| 6,389,464 B1 * | 5/2002 | Krishnamurthy et al. | 709/220 |
| 6,393,475 B1 * | 5/2002 | Leong et al. | 709/223 |
| 6,400,689 B1 * | 6/2002 | Sato et al. | 370/242 |
| 6,456,306 B1 * | 9/2002 | Chin et al. | 709/224 |
| 6,470,388 B1 * | 10/2002 | Niemi et al. | 709/224 |
| 6,490,617 B1 * | 12/2002 | Hemphill et al. | 709/223 |
| 6,502,131 B1 * | 12/2002 | Vaid et al. | 709/224 |
| 6,664,978 B1 * | 12/2003 | Kekic et al. | 709/224 |
| 6,714,977 B1 * | 3/2004 | Fowler et al. | 709/224 |
| 6,788,315 B1 * | 9/2004 | Kekic et al. | 709/223 |
| 6,930,985 B1 * | 8/2005 | Rathi et al. | 709/223 |
| 6,978,302 B1 * | 12/2005 | Chisholm et al. | 709/224 |

OTHER PUBLICATIONS

Guiagoussou, Mahamat et al. "Implementation of a Diagnostic and Troubleshooting Multi-Agent System for Cellular Networks." International Journal of Network Management. vol. 9, Issue 4. Jul.-Aug. 1999. pp. 221-237. John Wiley & Sons, Inc.*

Carzaniga, Antonio et al. "Design and Evaluation of a Wide-Area Event Notification Service." ACM Transactions on Computer Systems. vol. 19, Issue 3. Aug. 2001. pp. 332-383. ACM Press.*

* cited by examiner

| MONTH | DATE | DOWN | UP | FRAME | RMDR |
|-------|------|------|-----|-------|------|
| MAR   | 26   | 0    | 0   | 0     | 0    |
| MAR   | 27   | 18   | 20  | 0     | 0    |
| MAR   | 28   | 122  | 86  | 0     | 0    |
| MAR   | 29   | 106  | 132 | 0     | 0    |
| MAR   | 30   | 94   | 144 | 0     | 0    |

FIG. 4

METHODS AND SYSTEMS FOR NETWORK ELEMENT FAULT INFORMATION PROCESSING

BACKGROUND OF THE INVENTION

1. Field of the Invention

Embodiments of the present invention relate to network communications systems. More particularly, embodiments of the present invention relate to systems and methods for network element fault information processing.

2. Background Information

A known telecommunications management system is the Navis Core™ Element Management System from Lucent Technologies of Murray Hill, N.J. Navis Core is a centralized service and network management application. It can provide standards-based management and control of telecommunications network elements of networks such as frame relay, Switched Multimegabit Data Service ("SMDS"), Asynchronous Transfer Mode ("ATM"), and Internet Protocol ("IP") switch networks. Navis Core includes a distributed and multiservice element manager and is a graphically integrated UNIX-based platform that provides a network management solution based on Telecommunications Network Management ("TNM") standards.

Navis Core can speed circuit provisioning with point-and-click operations to establish end-to-end network connectivity and provides a variety of traps for alarm indications and statistics logic for elements in the switch network such as switches, trunks, physical ports, logical ports, permanent virtual circuits ("PVCs"), switched virtual circuits, and so on. A Navis Core user can use network statistics for real-time status information on logical and physical ports and view key usage data on such interfaces for network planning and trend analysis. Network element faults (i.e., network faults) can be reported to a central repository where a Navis Core operator can access the network element fault information.

A central repository receiving the reported network element faults is typically one or more Navis Core servers. The Navis Core servers record the reported element network faults in files typically called trap logs. Examples of trap log information are as follows:

985885337 1 Thu Mar 29 12:02:17 2001 NWORLAM-ABB1—Switch nwor1amabb1 interface up (SNMP linkUp trap) on LPort 60QGDA500180_LMC(14,7); 1.1.3.6.1.4.1.277.10.0.10003 0;

985885337 7 Thu Mar 29 12:02:17 2001 NWORLAM-ABB1—LPort 60QGDA500180_LMC(14,7) at switch nwor1amabb1 is up with Customer Name SUPERS_SUPERMARKET.;3.1.3.6.1.4.1.277.10.0. 30 0; and 985885533 7 Thu Mar 29 12:05:33 2001 NWORLAM-ABB1—LPort 60QGDA500180_LMC(14,7) in switch nwor1amabb1 is up, following PVCs is also up: HOUM_SUPERS_SUPERMARKE_100_99 NWOR_SUP ERS_SUPERMARK ET_100_101 NWOR_SUPERS_SUPERMARKET_100_103 NWOR_SUPERS_SU PERMARKET_100_104 NWOR_SUPERS_SUP ERMARKET_100_105 NWOR_R OUSES_SUPERMARKET_100_106 NO WR_SUPERS_SUPERMARKET_100_107 NWOR_ SUPERS_SUPERMAR KET_100_108 NWOR_ SUPERS_SUPERMARKE T_100_109 NWOR_ SUPERS_SUPERMARKET_110_110 NWOR_ SUPERS_MRKT_NNI_BTR_20 2_758 HOUM_ SUPERS_SUPERMARKET_203_203.; 1.1.3.6.1.4.1.277.10. 0.10009.

Trap logs and other network element fault information can indicate network fault events but are cumbersome to search and display. For example, if a customer of a network services provider complains about service problems (e.g., loss of service, degrading of service levels, and so on) a network technician can retrieve and sequentially review the trap logs to determine information about the customer's network services. In view of the foregoing, it can be appreciated that a substantial need exists for systems and methods that can advantageously provide for network element fault information processing.

BRIEF SUMMARY OF THE INVENTION

Embodiments of the present invention relate to systems and methods for network element fault information processing. In an embodiment, a network element identifier and a network element fault information processing instruction are received. A query for network element fault information based at least in part on the network element identifier is sent. Network element fault information is received. The network element fault information is processed based at least in part on the received network element fault instruction. The processed network element fault information is output.

BRIEF DESCRIPTION OF THE DRAWINGS

FIG. 4 shows an example of processed network element fault information in accordance with an embodiment of the present invention.

DETAILED DESCRIPTION OF THE INVENTION

According to an embodiment of the present invention, a system receives an instruction (e.g., from a user) to retrieve network element fault information from a server that stores, for example, network fault information corresponding to a network element. For example, the server can be coupled to one or more network elements such as a network switch, a network circuit, a network path, and so on. When a network fault related to a network element is detected, information corresponding to the network fault can be sent to the server for storage in a trap log. The network element fault information can include, for example, an identifier of the network element, a fault type identifier corresponding to the type of network fault, a time and/or date identifier associated with the time and/or date of the network fault, and so on.

The instruction to retrieve network element fault information corresponding to a network element can include a network element identifier corresponding to the network element. For example, a user can input a network element identifier, and the network element identifier can be a permanent virtual circuit ("PVC") identifier, a logical port ("LP") identifier, and so on. One or more trap logs corresponding to the network element can be queried for and received. The instruction to retrieve the trap log information can also include a requested fault type identifier that specifies which type of fault type information should be output (e.g., displayed, printed, etc.) to the user. For example, a user may be interested in displaying network fault information associated with network element transitions to an up state. The trap log can be analyzed (e.g., searched, parsed, etc.) to determine network fault information associated with the requested fault type identifier, and the determined network fault information can be presented to the user.

Figure 1:
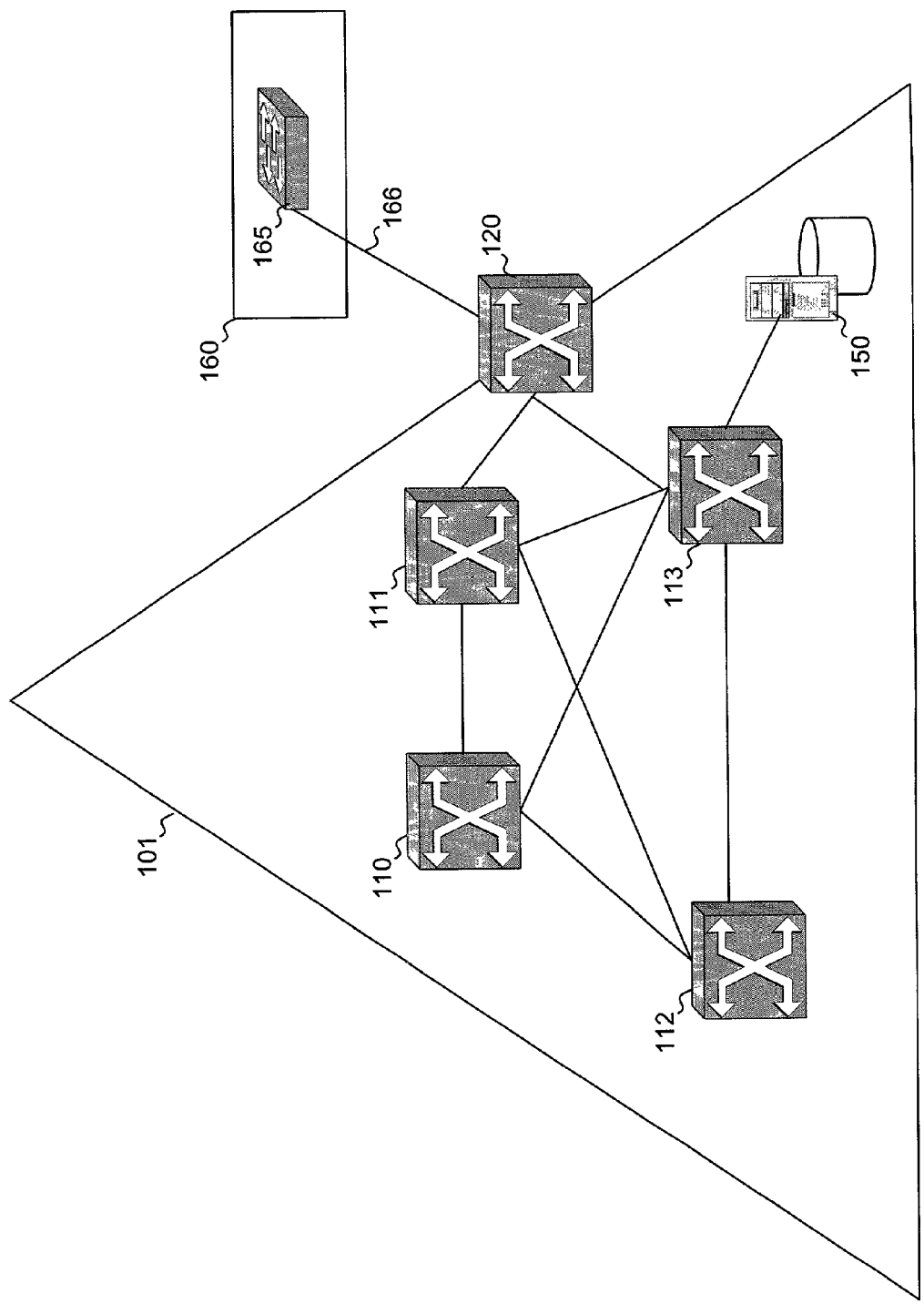
FIG. 1 is a schematic diagram of an embodiment of the present invention.

FIG. 1 is a schematic diagram of an embodiment of the present invention. Network 101 includes interior switches 110, 111, 112, and 113 (e.g., core switches, etc.), which are coupled together. As used to describe embodiments of the present invention, the term "coupled" encompasses a direct connection, an indirect connection, or a combination thereof. Moreover, two devices that are coupled can engage in direct communications, in indirect communications, or a combination thereof. Network 101 can be a data network such as a frame relay network, an SMDS network, an ATM network, an IP network, a Multiprotocol Label Switching ("MPLS") network, an X.25 network, and so on. Accordingly, switches 110–113 can be frame relay switches, SMDS switches, ATM switches, IP switches, MPLS switches, X.25 switches, and so on.

Network 101 can also include switches such as an edge switch 120, which is coupled to one or more interior switches such as, for example, interior switches 111 and 113. An edge switch 120 is typically the first point of user (e.g., customer) access to a network and the final point of exit for communications to the user. Edge switches are typically inter-coupled by interior switches such as switches 110–113. Edge switch 120 is coupled to customer premises equipment 165 of a customer location 160 via a communications link 166. Examples of customer premises equipment 165 include a switch, a router, a network interface device, a modem, a cable modem, a digital subscriber line ("DSL") modem, and so on. Examples of communications link 166 include a 56K line, a 64K line, a T1 connection, a T3 connection, and so on. Further examples of communications link 166 include a PVC, a permanent virtual path ("PVP"), and so on. In an embodiment, communications link 166 is associated with a logical port.

Figure 2:
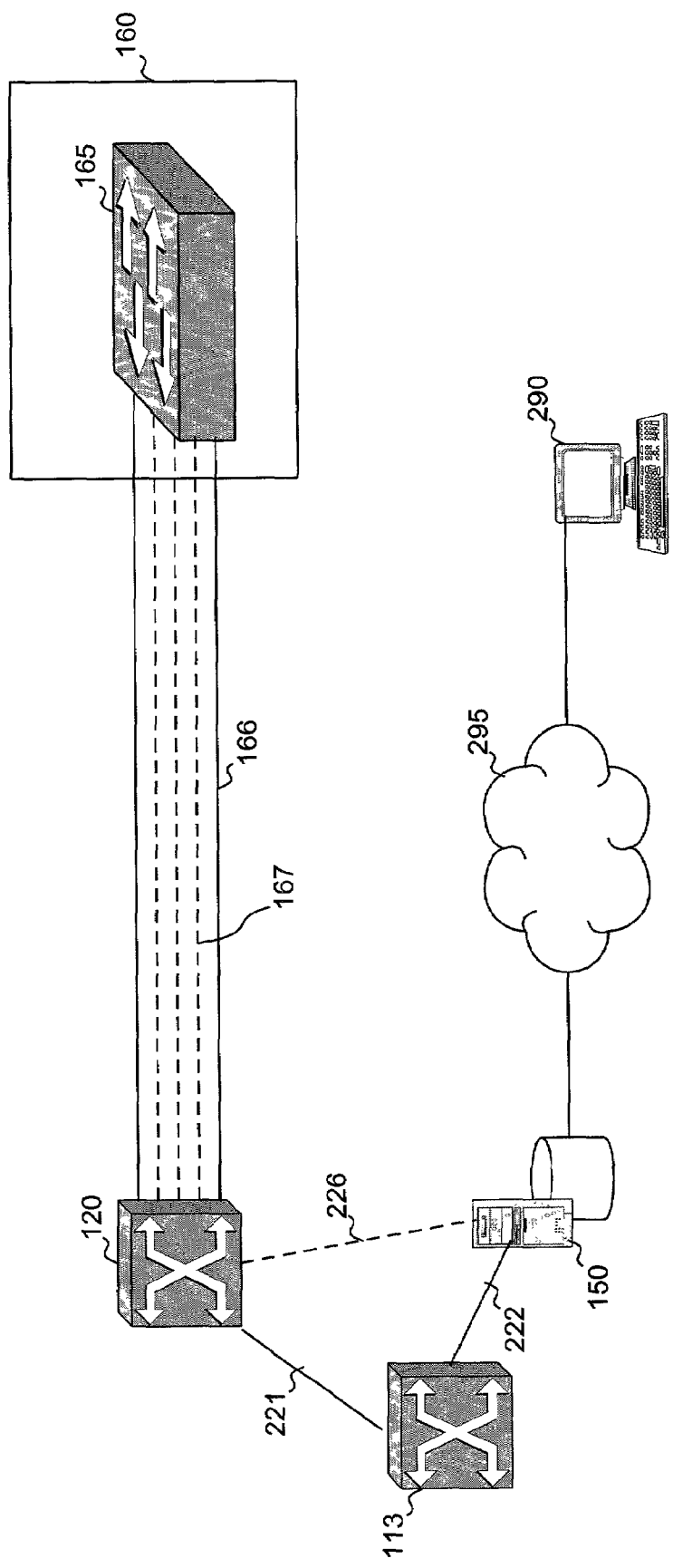
FIG. 2 illustrates a system in accordance with an embodiment of the present invention.

FIG. 2 illustrates a system in accordance with an embodiment of the present invention. Network faults can occur with respect to communications between edge switch 120 and CPE 165 via communications link 166. For example, communications to and/or from edge switch 120 can bounce, the communications link 166 can go down and subsequently up, CPE 165 may not function properly, and so on. In an embodiment in which network 101 of FIG. 1 is a frame relay network, frame errors can occur. In an embodiment in which network 101 is, for example, an ATM network or a frame relay network, communications link 166 can be a PVC or PVP that goes down periodically. In a further embodiment, communications link 166 can include one or more communication sub-links 167 (e.g., cables, wires, optical fibers, circuits, etc.) and/or associated equipment such as amplifiers, multiplexers ("MUXs"), and so on. A network fault can be a faulty amplifier, a failed MUX, a short circuit, and so on. Based in part on the description of embodiments of the present invention provided herein, other examples of network faults will be apparent to one of skill in the art.

Edge switch 120 can determine network faults corresponding to edge switch 120, communications link 166, and/or CPE 165 and report the network faults to server 150. For example, edge switch 120 can send a network fault report (e.g., a network fault message) to server 150 after determining one or more network faults. Edge switch 120 can include parameters that can determine at least in part when network fault conditions are to be reported to server 150. For example, edge switch 120 can include parameters that establish that certain types of network faults (e.g., frame errors, down errors, etc.) are reported to server 150. Edge switch 120 can also include parameters that establish a threshold severity or persistence of a network fault that will result in reporting the network fault to server 150. For example, a down error can be reported to server 150 when it lasts more than five (5) cycles. Alternatively, individual frame errors may not be reported to server 150, but after a threshold value related to frame errors is met or exceeded, a frame error network fault report can be sent to server 150. For example, a certain number of frame errors in a period of time can trigger sending of a frame error network fault report to server 150.

Server 150 can store received network fault reports received from edge switch 120. For example, server 150 can store network fault reports received from edge switch 120 in a directory where each network fault report identifies a type of network fault, a date and/or time associated with the network fault, a network element associated with the network fault, and so on. In another embodiment, server 150 can store network fault reports received from edge switch 120 in a network fault report file where corresponding network fault reports are stored so that the network fault report file includes a history of network fault reports. In an embodiment, the network fault report file includes network fault reports from a long-term period (e.g., days, weeks, months, years, etc.). In another embodiment, the network fault report file is a buffer file that includes network fault reports for a rolling period of time (e.g., the previous five hours, the previous four days, the previous week, the previous 30 days, and so).

In an embodiment of the present invention, server 150 can be coupled to edge switch 120 via interior switch 113 and communication paths 221 and 222. In another embodiment, server 150 can be coupled to edge switch 120 via a communications path 226. Server 150, in an embodiment, can be a Navis Core server that receives network management information from edge switch 120. According to an embodiment, edge switch 120 includes a trap, which is a mechanism permitting a device to send (e.g., automatically, autonomously, periodically, etc.) an alarm for certain network events to a management station. Typically, network management information is acquired by polling network nodes on a periodic (e.g., regular) basis, but such a network management information acquisition strategy can be modified when a trap is set from a network device. With traps, a network element (e.g., a network node) alerts the management of an event (e.g., a network fault, a routine event, a catastrophic event, etc). The management station, in an embodiment, can initiate a polling sequence to network elements (e.g., nodes) to determine potential causes of the event. Such a trap and poll strategy is often called trap-directed polling.

Network management personnel often become aware of network faults when a customer (e.g., an owner or operator of CPE 165) complains that its communications are degraded or inoperative. To diagnose why the customer communications are degraded or inoperative, network management personnel often examine network fault reports stored on server. For example, network management personnel can examine network fault information stored on server 150 to ascertain whether there are any network faults associated with communications link 166, edge switch 120, and/or CPE 165.

Known methods of analyzing the network fault information relate to examining the native (e.g., unprocessed) network fault reports stored on server 150. For example, a network management technician can examine individual network fault reports (e.g., trap logs stored on a server) such as the following:

985885337 1 Thu Mar 29 12:02:17 2001 NWORLAM-ABB1—Switch nwor1amabb1 interface up (SNMP linkUp trap) on LPort 60QGDA500180_LMC(14,7); 1.1.3.6.1.4.1.277.10.0.10003 0;

985885337 7 Thu Mar 29 12:02:17 2001 NWORLAM-ABB1—LPort 60QGDA500180_LMC(14,7) at switch nwor1amabb1 is up with Customer Name SUPERS_SUPERMARKET.;3.1.3.6.1.4. 1.277.10.0.30 0; and 985885533 7 Thu Mar 29 12:05:33 2001 NWORLAM-ABB1—LPort 60QGDA500180_LMC(14,7) in switch nwor1amabb1 is up, following PVCs is also up: HOUM_SUPERS_SUPERMARKE__100__99 NWOR_SUP ERS_SUPERMARK ET__100__101 NWOR_SUPERS_SUPERMARKET__100__103 NWOR_SUPERS_SU PERMARKET__100__104 NWOR_SUPERS_SUP ERMARKET__100__105 NWOR_R OUSES_SUPERMARKET__100__106 NO WR_SUPERS_SUPERMARKET__100__107 NWOR_ SUPERS_SUPERMARKET__100__108 NWOR_ SUPERS_SUPERMARKE T__100__109 NWOR_ SUP ERS_SUPERMARKET__110__110 NWOR_ SUPERS_MR KT_NNI_BTR__20 2__758 HOUM_ SUPERS_SUPERMARKET__203__203.;1.1.3.6.1. 4.1.277.10. 0.10009.

Native network fault information, such as the examples above, are difficult to review and analyze. The native network fault information provides required information, but also can include too much information when attempting to troubleshoot a fault or problem in a communications network. In an embodiment of the present invention, network fault information is identified, retrieved, and processed to aid in network management analysis and operations. For example, a network element can be identified, a network fault type can be specified, network element fault information associated with the network element can be retrieved, and the network fault information can be processed based in part on the specified network fault type.

Figure 3:
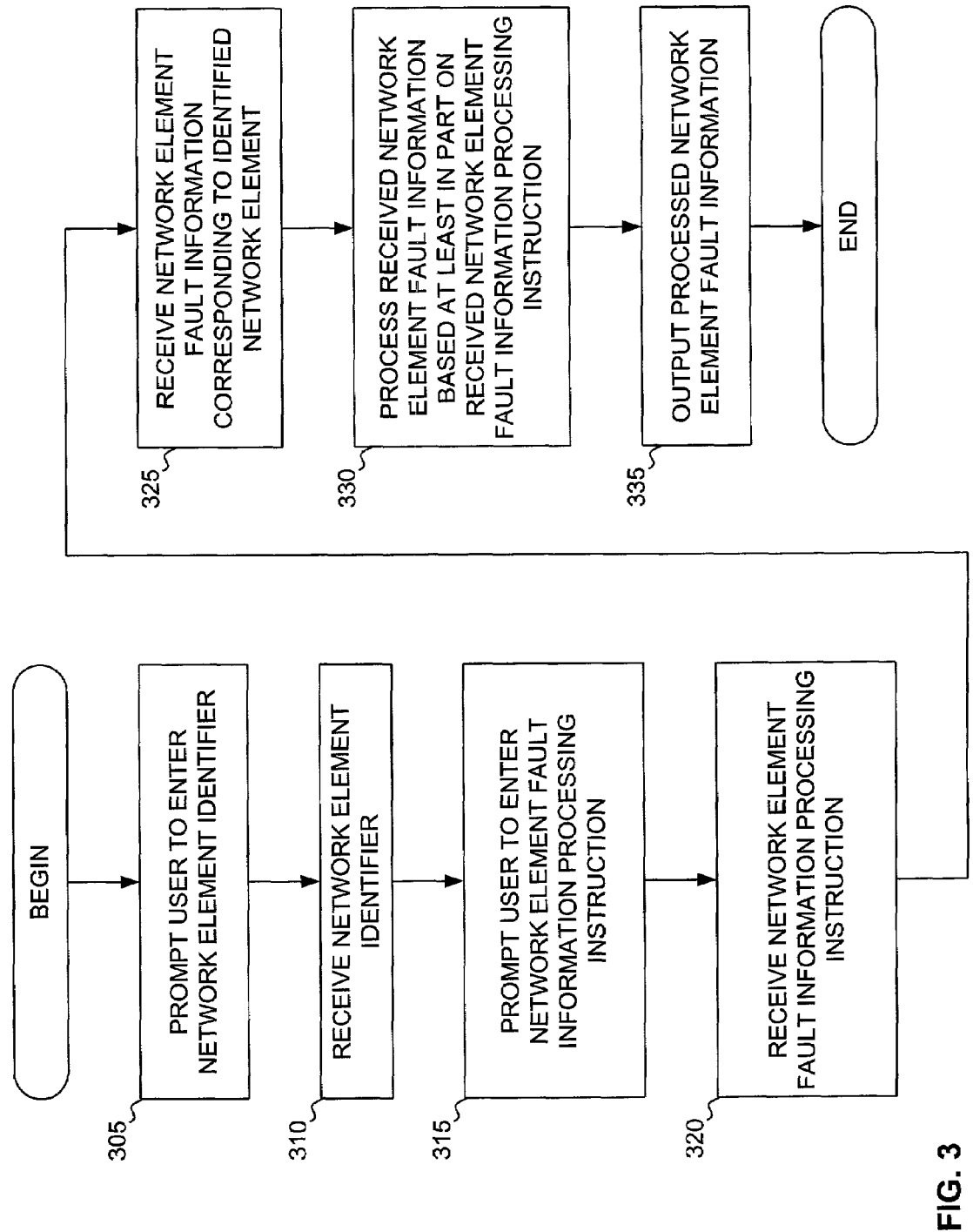
FIG. 3 illustrates a method in accordance with an embodiment of the present invention.

FIG. 3 illustrates a method in accordance with an embodiment of the present invention. A user can be prompted to enter a network element identifier (step 305). For example, a network element identifier can be a switch identifier, a circuit identifier, a communications link identifier, a PVC identifier, a logical port identifier, a combination thereof, and so on. In an embodiment, a user can be prompted to enter one or more network element identifiers such as a switch identifier and a circuit identifier. In another embodiment, a user can be prompted to enter a trap log identifier, a Navis Core server identifier, a combination thereof, and so on. In an embodiment, the user is prompted to enter a network element identifier by a computer program or a software script executing on a computer.

For example, referring again to FIG. 2, a computer 290 can be coupled to server 150. In an embodiment, computer 290 includes a processor and a memory. The processor can be, for example, an Intel Pentium® 4 processor, manufactured by Intel Corp. of Santa Clara, Calif. As another example, the processor can be an Application Specific Integrated Circuit (ASIC). The memory may be a random access memory (RAM), a dynamic RAM (DRAM), a static RAM (SRAM), a volatile memory, a non-volatile memory, a flash RAM, polymer ferroelectric RAM, Ovonics Unified Memory, magnetic RAM, a cache memory, a hard disk drive, a magnetic storage device, an optical storage device, a magneto-optical storage device, or a combination thereof. The memory of computer 290 can store a plurality of instructions adapted to be executed by processor of computer 290.

In an embodiment, computer 290 is coupled to server 150 via a network 295 and a network connection (e.g., data port, input/output port, etc.). Examples of a network 295 include a Wide Area Network (WAN), a Local Area Network (LAN), the Internet, a wireless network, a wired network, a connection-oriented network, a packet network, an Internet Protocol (IP) network, or a combination thereof.

Referring again to FIG. 3, a network element identifier can be received (step 310). The user can be prompted to enter a network element fault information processing instruction (step 315). For example, a network element fault information processing instruction can be an instruction to display transitions to a down state, an instruction to display transitions to an up state, an instruction to display a log of transitions for a period of time (e.g., the previous day, the previous four days, the previous week, etc.), an instruction to display network element fault information in a simplified format, an instruction to display network element fault information in the native format, a combination thereof, and so on. The network element fault information processing instruction can be received (step 320). Based at least in part on the received network element identifier, network element fault information corresponding to the network element identified by the network element identifier can be received. For example, the network element fault information can be queried for from a Navis Core server associated the identified network element. In another embodiment of the present invention, the network element fault information is queried from the network element. In a further embodiment of the present invention, the identified network element receives the query for the network element fault information and sends the query to a network management station (e.g., a server) that receives network fault information from the network element.

After the network element fault information is received, it can be processed based at least in part on the received network element fault information processing instruction (step 330). For example, when the received network element fault information processing instruction is an instruction to display transitions to an up state, the network element fault information can be processed to isolate and/or summarize the network fault information corresponding to transitions to an up state. As another example, when the received network element fault information processing instruction is an instruction to display transitions to a down state, the network element fault information can be processed to isolate and/or summarize the network fault information corresponding to transitions to a down state. In another example, when the received network element fault information processing instruction is an instruction to display a log of transitions for a period of time, the network element fault information can be processed to isolate and/or summarize the network element fault information corresponding to transitions to an up state and transitions to a down state. After the received network element fault information has been processed based at least in part on the received network element fault information processing instruction, the processed network element fault information can be output (step 335). For example, the processed network element fault information can be output to a printer, to a display device (e.g., a Cathode Ray Terminal ("CRT") display, a Liquid Crystal Diode ("LCD") display, a video display, a text display, a dumb terminal, etc.), to a personal digital assistant ("PDA"), to a combination thereof, and so on.

FIG. 4 shows an example of processed network element fault information in accordance with an embodiment of the present invention. A user can specify a network element identifier and a network element fault information processing instruction. Network element fault information corresponding to the network element identifier can be queried for and received, and then processed based at least in part on the network element fault information processing instruction. For example, a user can specify that information about specific types of network element faults for a network element be identified and summarized.

In an embodiment of the present invention, a data record 400 is generated based on a specified processing of network element fault information. Data record 400 can correspond to a network element such as a network switch, a network circuit, a network logical port, a combination thereof, and so on. Data record 400 can include one or more entries 410, and each entry of at least a subset of the one or more entries 410 can include one or more chronological data fields to store chronological data. For example, data record 400 can include an entry 410 including a month identifier field 411 to store a month identifier and a date identifier field 412 to store a date identifier. Entry 410 of data record 400 can also include one or more network fault indicator fields. For example, entry 410 can include a down state field 413 to store a down state value (e.g., a number of times a network element was in a down state, a boolean value indicating whether the network was in a down state, etc.), an up state field 414 to store an up state value, a frame error state field 415 to store a frame error state value, and a remainder network fault state field 416 to store a remainder network fault state value.

For example, data record 400 is generated based at least in part on native network fault information received from a network management station (e.g., trap log information from a Navis Core server). The native network fault information is processed to identify and/or summarized network faults. Data record 400 indicates, for example, that the network element corresponding to data record 400 reported the following number of down network faults for March 26 through March 30 respectively: 0, 18, 122, 106, and 94. The network element also reported the following number of up network faults for March 26 through March 30 respectively: 0, 20, 86, 132, and 144. The network element did not report any frame errors or any remainder network faults for March 26 through March 30. According to alternative embodiments of the present invention, a data record can be generated that includes processed network element fault information corresponding to one or more network faults over varying periods of time (e.g., day by day, hour by hour, week by week, minute by minute, and so on).

Embodiments of the present invention relate to data communications via one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications. For example, a communications link can include multiplexed communications channels, such as time division multiplexing ("TDM") channels, frequency division multiplexing ("FDM") channels, code division multiplexing ("CDM") channels, wave division multiplexing ("WDM") channels, a combination thereof, and so on.

In accordance with an embodiment of the present invention, instructions adapted to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions adapted to be executed. The terms "instructions adapted to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Systems and methods in accordance with an embodiment of the present invention disclosed herein can advantageously process (e.g., analyze and/or summarize) network element fault information. A user can identifier a network element by inputting one or more network element identifiers. The user can also specify a network element fault information processing instruction. The network element fault information can be processed based at least in part on the specified network element fault information processing instruction.

Embodiments of systems and methods for network element fault information processing have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, systems and methods in accordance with embodiments of the present invention have been described with reference to specific exemplary embodiments. Accordingly, the present specification and figures are to be regarded as illustrative rather restrictive.

What is claimed is:

1. A system for network element fault information processing, the system comprising:
   a network management server;
   an interior network element, coupled to the network management server;
   an edge switch coupled to the interior network element, the interior network element located within a network, wherein the edge switch is a first point of access to the network for communication by a customer;
   a trap log resident in the edge switch, wherein the trap log sends an alarm to the network management server via the interior network element to alert for specified network events;
   a first communications link coupled to the interior network element, the first communications link to carry communications to and from a customer via the edge switch;

and
a computer, the computer coupled to the network management server, the computer including a processor and a memory, the memory storing a plurality of instructions to be executed by the processor, the plurality of instructions including instructions to receive a network element identifier from a user, the network element identifier corresponding to the network element, wherein the network element is a switch, the switch coupled to the network management server, the network management server including network element fault information, and wherein the communications link includes one or more communications circuits;

receive a network element fault information processing instruction;

receive the network element fault information from at least the alarms from the trap log;

process the network element fault information for display to the user based at least in part on the received network element fault information processing instruction, wherein the instructions to process the network element fault information include instructions to summarize the identified network element fault information corresponding to a plurality of network element faults, the plurality of network element faults comprising transitions to down state, transitions to up state, frame errors and remainder network faults;

store the network element fault information into a network fault file wherein the network element fault file contains network element fault information collected over a rolling time period, wherein the rolling time period comprises a previous finite time period wherein the previous finite time period is selected from the group consisting of a plurality of hours, a plurality of days, a week, and a month; and display in tabular form the identified network element fault information corresponding to the plurality of network element faults over the previous finite time period.

2. The system of claim 1, wherein the plurality of instructions include instructions to prompt a user to enter the network element identifier.

3. The system of claim 1, wherein the plurality of instructions include instructions to prompt a user to enter the network element fault information processing instruction.

4. The system of claim 1, wherein the instructions to receive network element fault information include instructions to query for the network element fault information based at least in part on the received network element identifier.

5. The system of claim 1, wherein the instructions to process the network element fault information include instructions to identify network element fault information corresponding to one or more network element faults.

6. The system of claim 5, wherein the instructions to process the network element fault information include instructions to summarize the identified network element fault information corresponding to one or more network element faults.

7. The system of claim 6, wherein the instructions to process the network element fault information include instructions to determine a number of network element faults corresponding to one or more chronological periods.

8. The system of claim 6, wherein the instructions to process the network element fault information include instructions to determine a number of first network element faults and a number of second network element faults, the first network element faults being different from the second network element faults.

9. The system of claim 1, wherein the network element fault information is associated with one or more of the network element and the communications link.

10. The system of claim 9, wherein the network element fault information is associated with the communications link.

11. The system of claim 1, further comprising a server, the server coupled to the network element, the server including the network element fault information.

12. The system of claim 1, wherein the instructions to process the network element fault information include instructions to determine a number of first network element faults and a number of second network element faults, the first network element faults being different from the second network element faults.

13. A method of processing network element fault information, the method comprising:

receiving a network element identifier from a user via an edge switch coupled to an interior network element, the interior network element located within a network, wherein the edge switch is a first point of access to the network for communication by a user, the network element identifier corresponding to a network element;

receiving network element fault information based at least in part on the received network element identifier;

processing the network element fault information for display to the user based at least in part on a network element fault information processing criteria, wherein the network element fault information processing criteria provides the user with an option to choose between a fixed time period and a rolling time period, wherein the rolling time period comprises a previous finite time period wherein the previous finite time period is selected from the group consisting of a plurality of hours, a plurality of days, a week, and a month;

generating a network element fault data record based at least in part on processing the network element fault information, the network element fault data record including a plurality of data entries, each data entry of at least a subset of the network element fault information including a chronological information field and a network fault indicator field, the chronological information field to store chronological information, the network fault indicator field to store a network fault indicator, wherein the network element fault data record is a buffer file containing network element fault information collected over one of the fixed time period and the rolling time period, and displaying in tabular form the identified network element fault information corresponding to the plurality of data entries over the previous finite time period.

14. The method of claim 13, wherein the network fault information processing criteria includes one or more network element fault types.

15. The method of claim 13, wherein:

the chronological information field is to store a date; and the network fault indicator field is store a numerical value corresponding to reported occurrences of a network fault.

* * * * *